July 2, 1963 A. M. STONE 3,096,164
CONTROL SYSTEM FOR CLOTHES DRYERS
Filed April 24, 1961 3 Sheets-Sheet 1
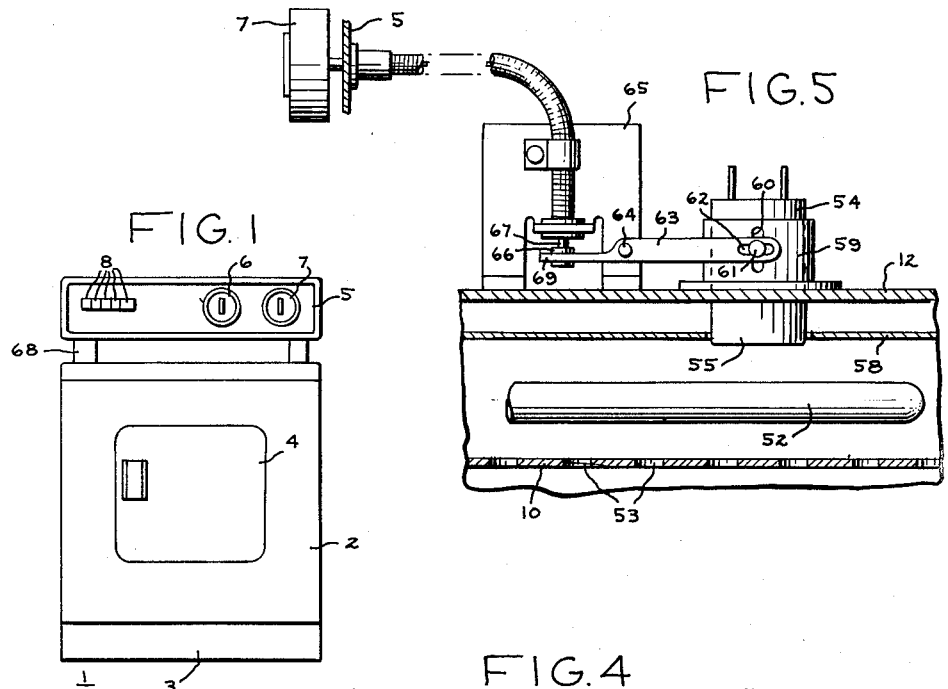
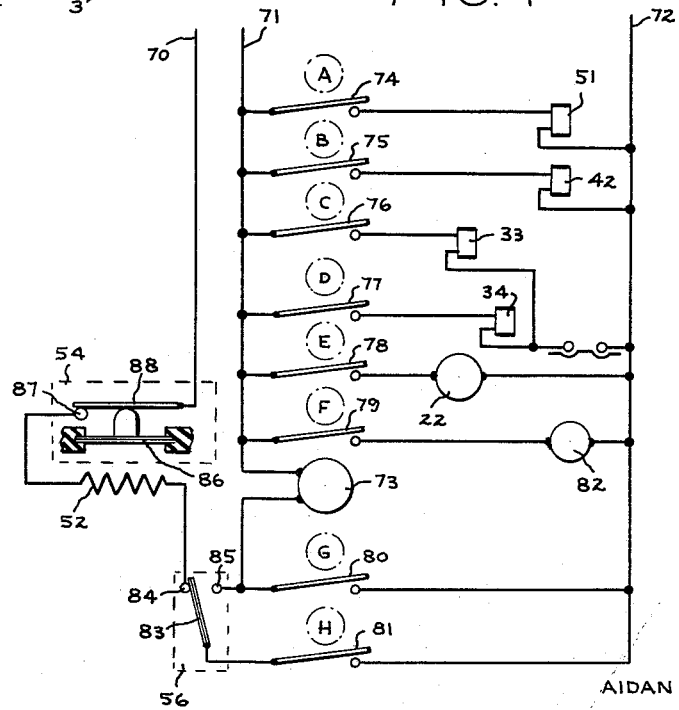
INVENTOR.
AIDAN M. STONE
BY Derek P. Lawrence
HIS ATTORNEY

INVENTOR.
AIDAN M. STONE

# 3,096,164
CONTROL SYSTEM FOR CLOTHES DRYERS
Aidan M. Stone, Louisville, Ky., assignor to General Electric Company, a corporation of New York
Filed Apr. 24, 1961, Ser. No. 105,162
3 Claims. (Cl. 34—45)

This invention relates to clothes dryers, and more particularly it relates to a control system for automatically controlling such machines during a drying operation.

It is highly desirable, in the art of clothes drying, to provide an automatic cycle which is dependent on the condition of the clothes for termination of the cycle. "Automatic cycle" is used, in this context, to signify the type of cycle which is automatically terminated when the clothes indicate a substantial condition of dryness, as opposed to the more primitive type of cycle wherein the operator merely presets a predetermined length of time for the operation, thereby guessing at the time it will take to effect drying of the clothes. In the type of automatic cycle used heretofore, it has been found difficult to achieve an entirely temperature-responsive arrangement (it being understood that clothes temperature in a dryer may be used as a reflection of the dryness of the clothes) wherein the cost of the structure is suitable for a highly competitive mass-production type market, and the response of the structure is substantially accurate so as to provide desirable results under virtually any circumstances.

One suitable control arrangement for effecting an automatic cycle is set forth in my application Serial No. 47,478 filed August 4, 1960, and assigned to General Electric Company, assignee of the present application. In that application, there is described the use of a cycling thermostat for the heating means of the structure, wherein the system is substantially improved by incorporating with the cycling thermostat a small auxiliary biasing heater energized and de-energized at the same time as the main heater.

It is an object of my present invention to provide a dryer control arrangement which incorporates substantially the same advantages as my previous application and which eliminates the need for the additional high resistance auxiliary heater required by that application, substituting in the place of an auxiliary heater a special positioning of the cycling thermostat relative to the main clothes heater in order to effect the desired result.

A further more specific object of my invention is to achieve an automatic cycle by a control which includes a cycling thermostat wherein the cycling thermostat not only is positioned adjacent the main heater so as to be influenced, or biased, thereby, but also is selectively movable relative to the main heater so that the degree to which the main heater affects the cycling thermostat may be adjusted.

In carrying out my invention in one form thereof, I provide clothes drying apparatus in which there is provided, in the conventional manner, a clothes receptacle and means for tumbling clothes in the receptacle together with means for heating clothes in the receptacle to effect drying of the clothes. A first thermostatic means has a low temperature normal position and a high temperature tripped position, and is positioned both so as to sense the air temperatures within the clothes receptacle, and also in adjacent relationship to the clothes heating means. When this first thermostatic means is in its normal position, it enables operation of the clothes heating means, and when it trips because of the temperature rise it prevents operation of the clothes heating means. By suitable calibration of the thermostatic means, it may thus provide cycling on and off of the clothes heating means during operation of the drying apparatus.

In addition, I provide a second thermostatic means which has a low temperature normal position and a high temperature trip position. This second means is positioned so as to sense the temperature of the clothes in the receptacle and is calibrated so as to move to the tripped position at a temperature which indicates dryness of the clothes. In the normal position of the second thermostatic means, it enables operation of the clothes heating means, while in its tripped position it prevents operation of the clothes heating means and, in addition, terminates operation of the apparatus either directly or, preferably, after a suitable cool-down period.

The result of the foregoing structure is that, because of the biasing effect of the heater on the first, or cycling, thermostatic means, it will rapidly cycle the clothes heater on and off, the "on" periods becoming shorter and the "off" periods becoming longer toward the end of the drying operation. This occurs because, as the clothes dry, they have a decreasing cooling effect on the first thermostatic means. When the clothes are dry, the second thermostatic means, which I prefer to position so that it actually contacts the clothes, trips thereby finishing operation of the heater. Because of the rapid "on-off" action resulting from the positioning of the cycling thermostat, a substantial number of "on-off" cycles of the clothes heater is provided, even for relatively delicate fabrics which require only a short drying time. There is an inherent advantage in a large number of short cycles of this type, as explained in my aforementioned application. The substantial number of cycles permits a gradual increase in the "off" time of the cycles, as opposed to the type of drying machine which has only two or three "on-off" cycles: in this latter type of machine, there can be relatively little difference in the power input per unit time for different cycles without the addition of relatively expensive modifications, such as additional heaters which may be shut off in sequence, and the like.

Additional features, which represent the optimum form of my invention, are to provide the two thermostatic means in the form of bi-metallic elements, and to make the position of the cycling thermostat relative to the heater adjustable so as to vary the distance therebetween thereby to vary the degree to which the heater directly affects the cycling thermostat.

The subject matter which forms my invention is particularly pointed out and distinctly claimed in the concluding portion of this specification. The invention itself, however, both as to organization and method of operation, together with further objects and advantages, may best be understood by reference to the following description taken in conjunction with the accompanying drawings.

In the drawings, FIGURE 1 is a front elevational view of a domestic laundry machine, specifically a combination washer dryer, which may advantageously incorporate my improved dryer control system;

FIGURE 4 is a schematic electrical diagram illustrating my improved dryer control; and FIGURE 5 is a cross-sectional view along line 5—5 in FIGURE 2.

Figure 2:
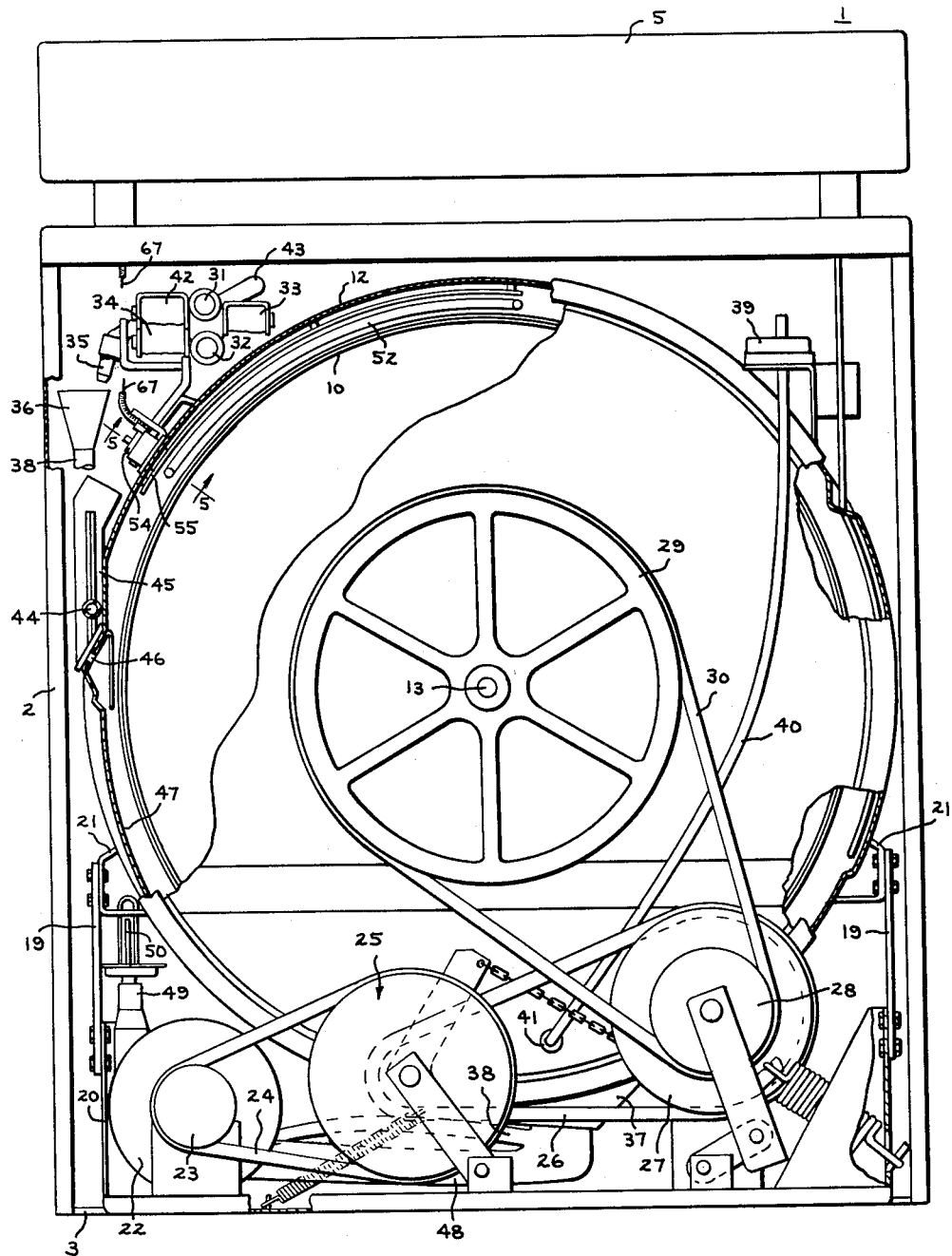
FIGURE 2 is a rear view of the machine of FIGURE 1, with the rear panel removed to illustrate details.
Figure 3:
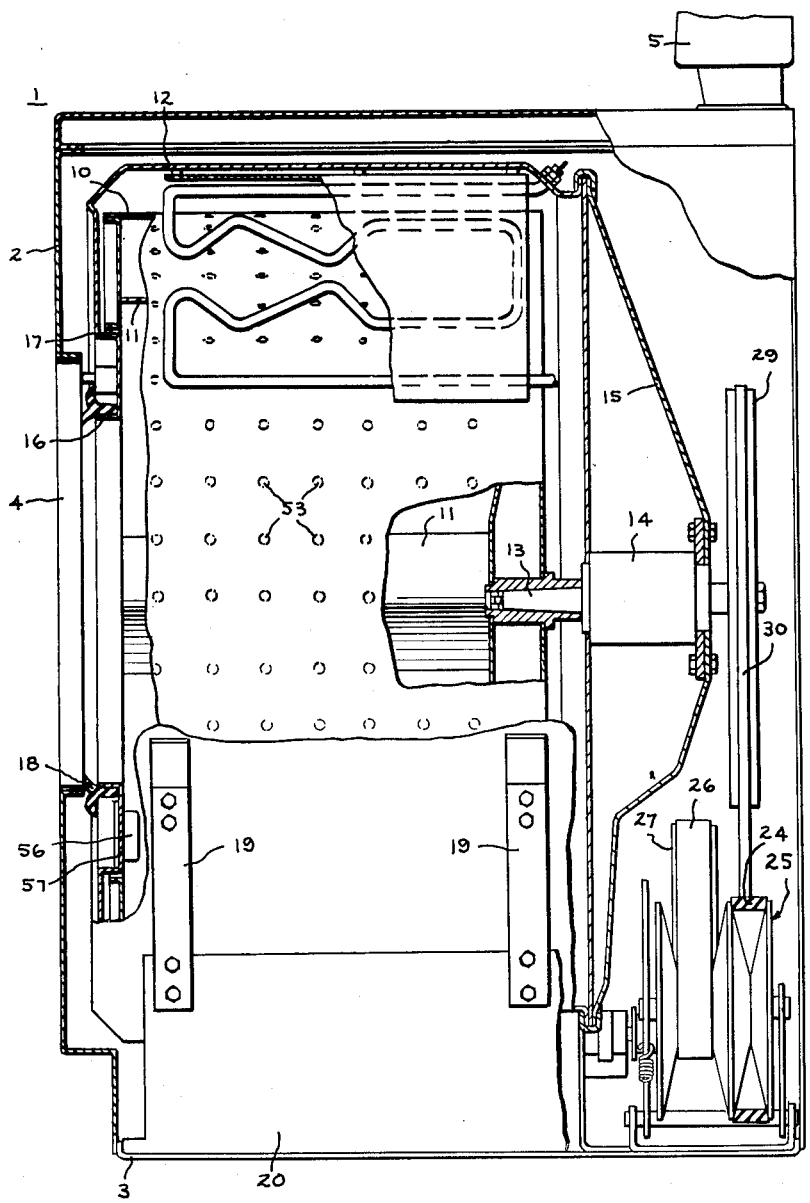
FIGURE 3 is a side elevational view of the machine of FIGURE 1 with the side panel removed, the view being partially in section and having certain surfaces broken away in order to illustrate details.

Referring now to FIGURES 1, 2, and 3, I have shown my invention in one form applied to a domestic laundry machine 1 comprising a combination washer and dryer. Machine 1 includes a cabinet 2 which is mounted on a supporting structure 3. Access to the machine for loading and unloading of the clothes is provided by a hinged door 4 disposed in the front wall of the cabinet. A backsplasher 5 mounted at the top of the cabinet serves as a mounting means for suitable operating controls for the machine. These controls may, for instance, comprise rotatable dials 6 and 7, and pushbuttons 8.

The machine 1 is of the type which includes a clothes basket rotatable about a non-vertical axis; specifically, referring to FIGURES 2 and 3, it includes a perforated basket 10 disposed for rotation about a generally horizontal axis and provided with a number of inwardly extending vanes 11 which help to tumble the clothes in the basket and also to circulate air during drying. Basket 10 is mounted within an imperforate tub structure 12 which encloses it on all sides. The basket is rotatably supported from the tub structure by a horizontally extending shaft 13 which is mounted in an elongated bearing 14 hung from the rear wall 15 of the tub structure. Shaft 13, as well as supporting the basket, also serves as the means for turning it during operation of the machine. The tub and basket are provided, respectively, with openings 16 and 17 in the front walls thereof, the openings being aligned with the door opening of the front wall of the cabinet 2 so that clothes may be placed into or removed from the basket. The door 4 seals against a gasket 18 around the tub opening 16 to close off the tub completely during operation of the machine.

Tub 12 is supported from base 3 by means of a plurality of brackets or arms 19 which are mounted on an upstanding plate 20 fixedly attached to the base 3. Four of these arms 19 are provided, two of them being secured to each side of the tub. Although the arms 19 can be secured directly to the wall of the tub 12, I prefer to attach them, as shown, by means of suitable brackets 21. With tub 12 supported in the manner shown, it vibrates sideways in a plane parallel to the front of the machine if the basket 10 should be unbalanced during high speed rotation thereof; however, for vibrations in the front to rear direction and in the vertical direction, the arms 19 are not at all flexible and they prevent substantially any vibration in those directions.

Referring now particularly to FIGURE 2, during operation of the machine the basket 10 is driven from an electric motor 22. The drive from the motor to the basket includes a pulley 23 which is secured to the motor shaft so as to rotate therewith, and over which passes a belt 24. Belt 24 drives an adjustable sheave assembly 25 of the type which is well known for use in achieving variable output speeds from a constant input speed source. The adjustable sheave assembly in turn operates belt 26 to cause rotation of a pair of pulleys 27 and 28. The rotation of pulley 28 is passed on to a pulley 29 by a belt 30, pulley 29 being rigidly secured on basket shaft 13. In this manner, the motor 22 may be driven at a constant speed, and, through the adjustable sheave assembly 25, the speed imparted to pulley 29 and basket 10 may be varied so as to provide an appropriate range of speeds for the basket. For instance, for tumbling purposes during cleansing and rinsing operations, and also during the heat drying operation, a speed of approximately 47 r.p.m. may be provided to the basket 10, while a centrifuging speed of several hundred r.p.m. may be provided to the basket for effecting centrifugal extraction of liquid from the clothes prior to the heat drying operation.

The operation of the variable speed drive briefly described above does not form any part of the present invention, and is set forth merely to provide a substantially complete description of an operative machine. A complete detailed description of such a drive is provided, for instance, in Patent 2,950,613 issued on August 30, 1960 to John Bochan and assigned to the General Electric Company, assignee of the present invention.

In order to admit water to the machine, connections 31 and 32 are provided through which hot and cold water may be supplied to the machine 1 for the washing operation. A valve controlled by the solenoid 33 admits hot water to the machine and a valve controlled by an opposed solenoid 34 admits cold water to the machine. The hot and cold water valves under the control of the solenoids 33 and 34 discharge into a common outlet conduit 35, through a suitable air gap, and into a funnel 36 which leads to a sump 37 formed at the bottom of tub 12. The connection may be made through a suitable conduit 38, part of which is shown leading from the funnel 36 and part of which is shown extending from the sump 37. The air gap provided above the funnel 36 makes it impossible, as is well known, for the water to be siphoned from the machine and thereby contaminate the incoming water supply line. A pressure actuated sensing device or water level control 39 may be provided to control both solenoids 33 and 34 so as to provide the proper water level in the machine during the washing operation. Sensing device 39 may be connected to the interior of tub 12 by a suitable conduit 40 which connects with the tub adjacent the bottom thereof at 41, as shown.

The illustrated machine is of the type which uses cold water during the drying cycle for condensing the moisture extracted from the clothes. The condenser water is admitted to the machine through an additional solenoid actuated valve controlled by a solenoid 42 which is energized during drying operations so that the valve passes water at a suitable rate sufficient to condense from the air the moisture vaporized from the clothes. As shown, the condenser water valve discharges into a conduit 43 which leads, through an appropriate air gap (not shown) to the inlet 44 of a vent trap 45 which is of the type commonly provided in connection with machines of this type in order to seal off the tub and basket from atmosphere during heat drying of the clothes while leaving the tub vented to atmosphere at other times. An appropriate construction for vent trap 45 is, for instance, fully described and claimed in patent 2,800,008—Raczynski, issued on July 23, 1957 and assigned to the General Electric Company, assignee of the present invention. From the vent trap 45, the condenser water flow into the tub 12 through an opening 46 and then flows in a thin sheet down the lower left wall 47 of the tub so as to cool a substantial portion of the area of the side wall and provide a large cool surface for condensing the moisture extracted from the clothes.

The wash and rinse water used during the washing portion of the operation, and the condenser water, and the moisture extracted from the clothes during the heat drying operation, are discharged from the machine through the sump 37 formed at the bottom of the tub 12. A suitable discharge hose 48 leads from the sump to a pump (not shown) which may be attached directly to the motor 22 so as to be continuously driven thereby and which in turn discharges through a conduit 49 to a valve 50. Valve 50 is suitably controlled by a solenoid 51 (schematically shown in FIGURE 4) so that when the solenoid is energized the valve 50 is closed and when the solenoid is not energized the valve 50 is opened. In other words, for water to be retained in the tub 12 the solenoid must be energized to close the valve 50 so that the continuous operation of the pump will not be effective to drain the tub. It will be understood that from valve 50 a connection is made to a suitable drain (not shown).

To heat the clothes during the heat drying portion of the cycle, there is provided in the machine a suitable heater assembly, preferably comprised in the present case of a single electric heater 52 which is positioned between tub 12 and basket 10. When the heater is energized during the drying cycle it operates to heat the basket 10 which, through its rotation, then contacts the clothes so as to transfer the heat to the clothes. In addition, since the outer cylindrical wall of the basket is perforated by a great many small spaced openings 53, the heating element also heats the clothes directly by radiation and convection. The heat thus transferred to the clothes causes vapor migration out of the clothes so as to effect drying thereof, the vapor in turn being removed from the air by the condenser system previously described.

A thermostat 54 is secured to the tub 12 and has a temperature sensing surface 55 positioned so as to sense the temperature of the air within the tub 12. In addition, a second thermostat 56 is provided (FIGURE 3); thermostat 56 is positioned to sense rises in the temperature of clothes in the basket. In this connection, I prefer to cause thermostat 56 to contact the clothes, and, accordingly, have provided it extending into the rotating basket through stationary wall 57 forming a part of the front of tub 12. With this arrangement of the thermostat 56, that is, stationary and relatively near the bottom of tub 12, the clothes within the basket 10, as they tumble, will virtually continuously contact the thermostat 36 thereby providing it with an accurate indication of the temperature of the clothes. In effect, this will be a wet bulb temperature when the clothes are wet, slowly changing to a dry bulb temperature as the clothes become dry. It will be recognized that the matter of ascertaining the approximate temperature at which clothes are dry under any particular circumstances is well known in the art, and that therefore the trip temperature of the thermostatic switch 56 may be preset so that it coincides substantially with the temperature at which clothes contained within basket 10 have become dry.

Referring now particularly to FIGURE 5 in conjunction with FIGURE 2, there is shown a substantially enlarged section of a portion of the machine. Specifically, FIGURE 5 shows the manner in which the cycling thermostat 54 is positioned with its portion 55 extending through the outer tub 12 and the reflector 58 provided for heater 52, into adjacency with the heater. Thermostat 54 is secured within a sleeve 59 which, in turn, is rigidly attached to the tub 12. Sleeve 59 includes a slot 60 through which extends a pin 61 formed as part of the thermostat 54. The pin also extends through a slot 62 formed in a member 63 pivoted on a pin 64 extending from a bracket 65 secured to the tub 12. On the other side of the pivotable support 64, member 63 has secured thereto an internally threaded member 66 within which is positioned the correspondingly threaded end of a flexible shaft 67. Shaft 67 extends upwardly through one of the posts 68 supporting the control panel 5 so as to have its other end securely connected to the knob 9 extending from the front of the control panel.

Turning dial 7 causes rotation of flexible shaft 67, and this rotation within the threaded member 66 either causes the end 69 of member 63 to be moved up or down with a consequent upward or downward movement of the other end of member 63. As a result, rotation of knob 9 causes the thermostat 54 to be moved within sleeve 59 toward or away from the heating element 52. In this manner, not only does thermostat 54 include a surface 55 which is both adjacent the heating element 52 and exposed to temperatures within the sealed drying chamber represented by the tub 10, but it is in addition movable toward or away from the heating element 52 so that the relative distance between them may be selectively varied thereby selectively to vary the heating effect of the heater 52 on the thermostat surface 55.

Referring now to the schematic circuit diagram of FIGURE 4, there is shown a simplified control arrangement for the machine 1 which includes my improved control arrangement utilizing the thermostats 54 and 56 and heater element 52. The electrical system of the machine 1 is energized across a suitable source of power through conductors 70, 71 and 72. Generally, in commercial practice, 220 volts are impressed across conductors 70 and 72, with 110 volts appearing between each of them and neutral conductor 71.

Directly connected to neutral line 71 is a timer motor 73 of any conventional well known type. Timer motor 73 forms a part of a conventional sequence control assembly wherein a number of cams A, B, C, D, E, F, G, and H control a number of switches such as those indicated by the numerals 74 through 81. When the timer motor 73 is energized, cams A through H are rotated and cause the switches 74 through 81 to open and close in a suitable sequence so as to effect the desired operations within the machine. In addition, it will be understood that in the conventional manner one of the dials, for instance dial 6, on the backsplasher of the machine, may be used manually to control the position of the switches 74 to 81 and to advance them from an "off" position which they normally attain at the end of the cycle to a "start" position when another cycle of operations is desired. Generally, when this is done, the switch 80 closes so as to complete an energizing circuit for the timer motor 73 across conductors 71 and 72. Thus, when the dial is released after having been put in the start position, the operation of the timer motor will cause the switch controls to open and close in a suitable sequence.

For illustrative purposes, the switches have been shown as controlling various components of the machine. Thus, switch 74 controls the drain valve solenoid 51, switch 75 controls the condenser valve solenoid 42, switch 76 controls the hot water solenoid 33, switch 77 controls the cold water solenoid 34, switch 78 controls the drive motor 22, and switch 79 controls the operation of a small gear motor assembly 82 which is generally provided to control the position of the adjustable sheave assembly 25, it being understood that in this type of structure energization of the gear motor 82 causes adjustment of the transmission to provide high speed basket rotation while deenergization of gear motor 82 causes a low basket speed.

The switch 80, as has been mentioned, controls the operation of timer motor 73. The last timer switch 81 may control the energization of either the heater 52 or the timer motor 73 depending upon whether bimetal element 83 of thermostat 56 (the bi-metal element constituting the temperature sensitive portion of the thermostat) is in the position shown in engagement with contact 84 (its normal position) or is in its tripped position in engagement with contact 85.

The thermostat 54 also includes temperature sensitive means in the form of a bi-metal element 86 which has a normal position and will snap, when its temperature rises a predetermined amount, to a tripped position. In its normal position, the bi-metal element 86 allows engagement of contact 87 and contact arm 88. However, when it moves to its tripped position, the bi-metal element 86 pushes up on contact arm 88 to separate it from contact 87. Contact 87 and contact arm 88 are in series with the heater 52, as is also true of contact 84 and switch arm 83.

When the dial 6 is rotated into cycle-starting position, timer motor 73 causes switches 75, 76, 77, 78 and 79 to open and close in a suitable sequence to provide a washing operation. For purposes of brevity, the particular sequence in which the switches are opened and closed will not be fully described, such sequences being relatively conventional features and susceptible of many modifications. In general, water is introduced into the machine with the drain valve closed for a washing step, then the water is drained out, then several rinses are provided with warm, hot or cold water, each rinse being followed by draining, and a high speed spin is provided thereafter in order to remove as much liquid as possible by centrifuging.

At the end of the high speed spin, timer motor 73 closes switch 81 to start a heat drying operation by completing a circuit which, starting at line 70, passes through contact arm 88, contact 87, heater 52, contact 84, bi-metallic element 83 and switch 81 to conductor 72; thus, a 220 volt energizing circuit for the heater 52 is completed. Shortly after switch 81 is closed, switch 80 is opened so as to deenergize the timer motor. At this point the drying operation is proceeding without any timing occurring, and with the heater 52 energized.

Because the bi-metallic element 86 of thermostat 54 is sensitive, through surface 55, to the heat provided by the heater 52, and since surface 55 is also within the tub 12 so as to have its temperature influenced by the state of the clothes therein, the element is being acted upon by both the air temperature within the tub and directly by the heater 52. In this connection, it can be seen that the degree to which heater 52 acts as a bias on the thermostat is influenced by the extent to which surface 55 is advanced toward or moved away from the heater 52 by rotation of dial 7. When the trip temperature of the bi-metal 86 is reached, it snaps to a position wherein the contacts 87 and 88 are separated to de-energize the heater 52. With the heater 52 de-energized, the clothes mass and the air in the basket start to cool down. In addition, bcause the thermostat 86 has been biased by its position adjacent heater 52, there is a very rapid heat decrease in the immediate area of the bi-metal 86 so that the reset temperature of the bi-metal is rapidly reached. This is particularly true if the clothes are still quite wet in which case, because of the energy absorbed by evaporation, the cooling effect in the basket and tub is faster.

Thus, the physical adjacency of thermostat 54 to heater 52 acts to effect a substantial increase in the rate at which the bi-metal 86 trips and resets itself after tripping. This action continues as long as the bi-metal 83 remains in engagement with contact 84, it being understood that the bi-metal 86 is calibrated so as to cause cycling on and off of heater 52 during ordinary operation of the machine. It will be apparent, because of the positioning of the bi-metal 86 adjacent heater 52 and because of the resulting shortening of the time required for an "on-off" cycle of the bi-metal 86, a substantial number of "on-off" cycles is provided for virtually any clothes drying operation. Of course, the more rapid the "on-off" cycling within reasonable limits the greater the sensitivity of the dry control system to different types of clothing. In this connection, it will be apparent that if a large normal load of clothes requires ten "on-off" cycles, then the availability of nine, eight, seven, etc., cycles for other different types of clothes loads affords far more sensitivity in the machine than if a large normal clothes load only had three "on-off" cycles. Such an arrangement only leaves a very limited number of "on-off" cycles which may be provided for drying sequences involving other types of clothing.

As previously stated, the bi-metal 83 is part of thermostat 56 which, in my preferred construction, actually projects into the basket 10 so as to contact the clothing tumbling therein. The main purpose of the thermostat 56 is to sense the clothing temperature, and while this may be done at a more remote location if so desired, it is desirable to have actual contact of the thermostat by the clothing as shown since this, in effect, affords a wet bulb temperature as long as the clothing is wet, changing to a dry bulb temperature as the clothing is dried.

With this arrangement, then, the thermostat 56 reflects quite accurately the temperature of the clothing, and the temperature of the clothing in turn, as is well known, reflects quite accurately the degree of dryness which it achieves. This is basically a result of the fact that when the rate at which moisture is evaporated from the clothing rises substantially to the rate at which energy is being put into the clothing in the form of heat, there is a plateau in the curve of temperature with respect to time, and it is only after a very substantial part of the moisture has been removed that the temperature will again begin to increase rapidly because all of the energy being put into the clothing is not being absorbed for evaporation purposes. Thus, when the end of the plateau is reached and a fairly sharp temperature rise is provided, this indicates that dryness of the clothes has been achieved. While this is true in all machines provided relatively constant external air temperature conditions exist, the concept provides its most accurate dryness measurement in a clothes system such as that described in connection with machine 1 wherein the drying chamber within tub 12 is sealed so that the same air is retained therewithin throughout the drying operation, the air being dried by the condensing system and then heated again by heater 52.

When the temperature sensed by thermostat 56 represents the dry temperature of the clothes, the bi-metal element 83 trips from contact 84 over into engagement with contact 85. This has the dual effect of de-energizing heater 52 and of re-energizing timer motor 73 through a circuit which starts at conductor 71 and then proceeds through timer motor 73, contact 85, bi-metallic element 83, switch 81, and conductor 72. After a brief period of operation of the timer motor, the switch 80 is closed to continue the timer motor energization and the switch 81 is opened to insure that there will be no further heating in the machine regardless of the position of bi-metal element 83. The timer motor then, preferably, provides a suitable period of tumbling by the energization of motor 22 so as to cool down the clothes, and then opens all circuits so as to de-energize all components of the machine.

Included among the advantages in the improved type of arrangement described above, it inherently provides the important function of decreasing the power input to the clothes as the drying cycle progresses. While a substantial amount of power is required to evaporate the moisture in the clothing when the clothing is fairly wet all the way through, a lesser amount is desirable as the clothing dries. This is partly because there is less moisture altogether, and partly because the moisture cannot be evaporated until it reaches the surface of the clothing and as the clothing dries the moisture comes to the surface more slowly.

I achieve the desired result of decreasing the power input toward the end of the cycle as a result of the fact that, despite the rapid re-set characteristic achieved by the positioning of my thermostat 54, the clothes, when they are partly dry, provide a heat reservoir which slows up the lowering of the temperature in the basket so that as the cycle progresses the "off" time becomes substantially greater compared to the "on" time. At the same time, the "on" time actually becomes shorter because there is not so much moisture to absorb energy and the temperature is inclined to rise more rapidly in the basket; this effect is very pronounced, substantially more so even than the lengthening of the "off" time. Thus, an inherent result of my structure is, in addition to the quick on-off cycling and the sensitivity resulting therefrom, a decrease in the amount of power input to the clothes as the cycle progresses, the power input being greatest at the beginning when it is so important that there be a high power input and decreasing to a minimum at the end of the cycle.

It will be observed, in addition, that I achieve the foregoing result by so positioning the thermostat 54 that the main heater 52 is caused to act, in addition, as a biasing heater.

It will further be observed that both thermostats 54 and 56 are shown as being of the bi-metal type. This is particularly significant in the case of thermostat 54. Without the biasing effect achieved by the positioning of the member, the response of bi-metal elements presently commercially available is substantially slower than bulb and bellows type thermostats as an inherent result of their construction. However, by the use of the particular position of my thermostat 54 I raise the sensitivity of the bi-metal type thermostat 54 to that normally provided only by bulb and bellows type thermostats. Thus, my improved control circuit is particularly significant in permitting replacement of bulb and bellows type thermostats by bi-metal type thermostats, inasmuch as the cost of the latter is very substantially less than that of the former.

In addition, it will be readily recognized that the use of the main heater together with a separate but adjacent thermostat 54 makes it possible, by mounting the two so as to be relatively movable to each other, to vary the effect of the main heater on thermostat 54 thereby varying in effect the basket temperature at which the cycling will occur.

While in accordance with the patent statutes I have described what at present is considered to be the preferred embodiment of my invention, it will be obvious to those skilled in the art that various changes and modifications may be made therein without departing from the invention, and I therefore aim in the appended claims to cover all such changes and modifications as fall within the true spirit and scope of my invention.

What I claim as new and desire to secure by Letters Patent of the United States is:

1. Clothes drying apparatus comprising: a clothes drying chamber substantially sealed from the atmosphere during operation of said apparatus; means for tumbling clothes in said chamber; clothes heating means positioned within said chamber for vaporizing moisture from clothes; condenser means within said chamber for removing moisture from the air therewithin after the moisture has entered the air from the clothes by evaporation; first thermostatic means having a low temperature normal position and a high temperature tripped position, said first thermostatic means being positioned both immediately next to said heating means and with a surface thereof projecting into said chamber to sense temperatures therewithin, said first thermostatic means being arranged to enable operation of said heating means in said normal position and to prevent operation of said heating means in response to movement to said tripped position, said first thermostatic means being calibrated to provide cycling on and off of said heating means during operation of said apparatus; second thermostatic means having a low temperature normal position and a high temperature tripped position, said second thermostatic means projecting into said chamber so as to contact the clothes therewithin and thereby sense rises in the temperature of the clothes, said second thermostatic means being calibrated to move from its normal position to its tripped position at a temperature indicating dryness of the clothes, said second thermostatic means being arranged to enable operation of said heating means in its normal position and to prevent operation of said heating means in response to movement to its tripped position; and means for terminating operation of said apparatus in response to movement of said second thermostatic means to its tripped positions.

2. The apparatus defined in claim 1 wherein said first thermostatic means and said heating means are movably mounted relative to each other, said apparatus including selecting means for selectively moving said first thermostatic means and said heating means to predetermined distances from each other.

3. The apparatus defined in claim 2 wherein said first thermostatic means is connected to be moved by said selecting means.

References Cited in the file of this patent

UNITED STATES PATENTS

| | | |
|---|---|---|
| 2,007,596 | Burke | July 9, 1935 |
| 2,505,041 | Gorsuch | Apr. 25, 1950 |
| 2,621,423 | Clark | Dec. 16, 1952 |
| 2,694,961 | Senn | Nov. 23, 1954 |
| 2,717,455 | Harris | Sept. 13, 1955 |
| 2,720,037 | Erickson | Oct. 11, 1955 |
| 2,743,531 | Steward | May 1, 1956 |
| 2,743,532 | Steward | May 1, 1956 |
| 2,869,247 | Metzger | Jan. 20, 1959 |
| 2,895,230 | Reiley | July 21, 1959 |
| 2,892,334 | Gray | June 30, 1959 |
| 3,028,680 | Conlee | Apr. 10, 1962 |